United States Patent [19]
Duggan et al.

[11] 3,964,845
[45] June 22, 1976

[54] APPARATUS FOR REPAIRING CONDUCTOR INSULATION

[75] Inventors: Thomas W. Duggan; Richard P. McNerney, both of Houston, Tex.

[73] Assignee: Schlumberger Technology Corporation, New York, N.Y.

[22] Filed: Dec. 26, 1974

[21] Appl. No.: 536,381

[52] U.S. Cl. ............................ 425/13; 425/108; 425/129 R
[51] Int. Cl.[2] .......................................... B29F 1/10
[58] Field of Search ............ 425/13, 111, 108, 127, 425/129 R, 183, 116; 264/36, 248, 261

[56] References Cited
UNITED STATES PATENTS

| | | | |
|---|---|---|---|
| 3,430,293 | 3/1969 | Humphries et al. | 425/111 |
| 3,496,609 | 2/1970 | Ferguson | 425/129 |
| 3,754,845 | 8/1973 | Rauscher et al. | 425/111 |

*Primary Examiner*—Francis S. Husar
*Assistant Examiner*—David S. Safran
*Attorney, Agent, or Firm*—David L. Mosely; William R. Sherman; Stewart F. Moore

[57] ABSTRACT

Apparatus for repairing insulation of an insulated conductor comprising a split yoke; an elongate, substantially cylindrical cavity formed in the mating surfaces of the yoke; an elongate, split, substantially cylindrical conductor mold or insert removably positioned in the cavity; an injection molding unit communicating with an opening in the conductor insert through an injection bore in the yoke to inject insulator into the conductor mold through such bore; a heating element within the yoke to melt the injected insulator over an area comprising the central area of the conductor mold; and a cooling element within the yoke to cool the ends of the conductor mold while the central area is heated, whereby the heat applied to the insulated conductor within the conductor mold does not extend to insulated conductor outside the yoke. In an optional embodiment, a tensioning device can be used to maintain the insulated conductor under tension during the repair. This apparatus allows the easy repair of insulation defects and imperfections, e.g., holes and bubbles, with the repaired insulated conductor, after surface finishing, having no greater dimensions than the original insulated conductor.

22 Claims, 10 Drawing Figures

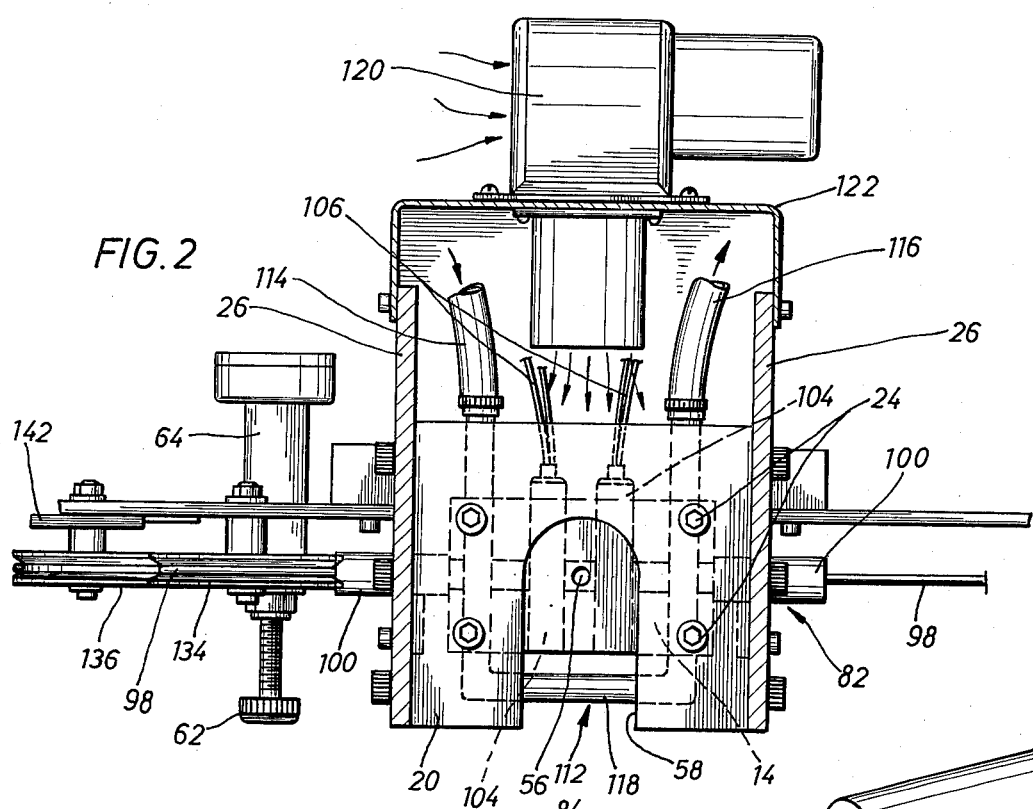
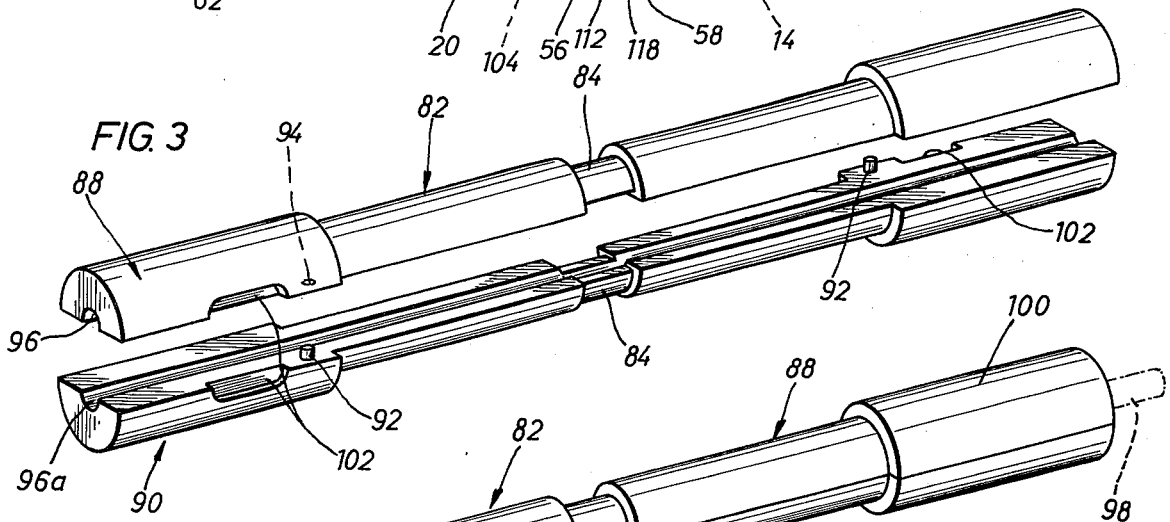
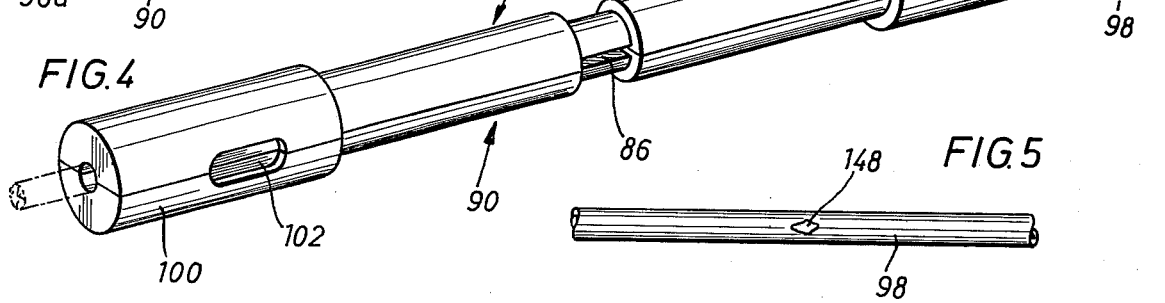
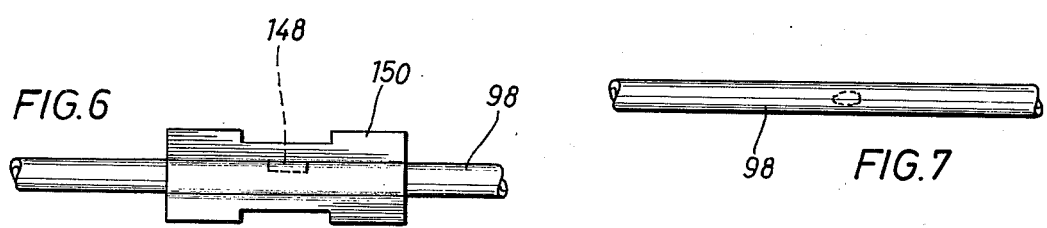

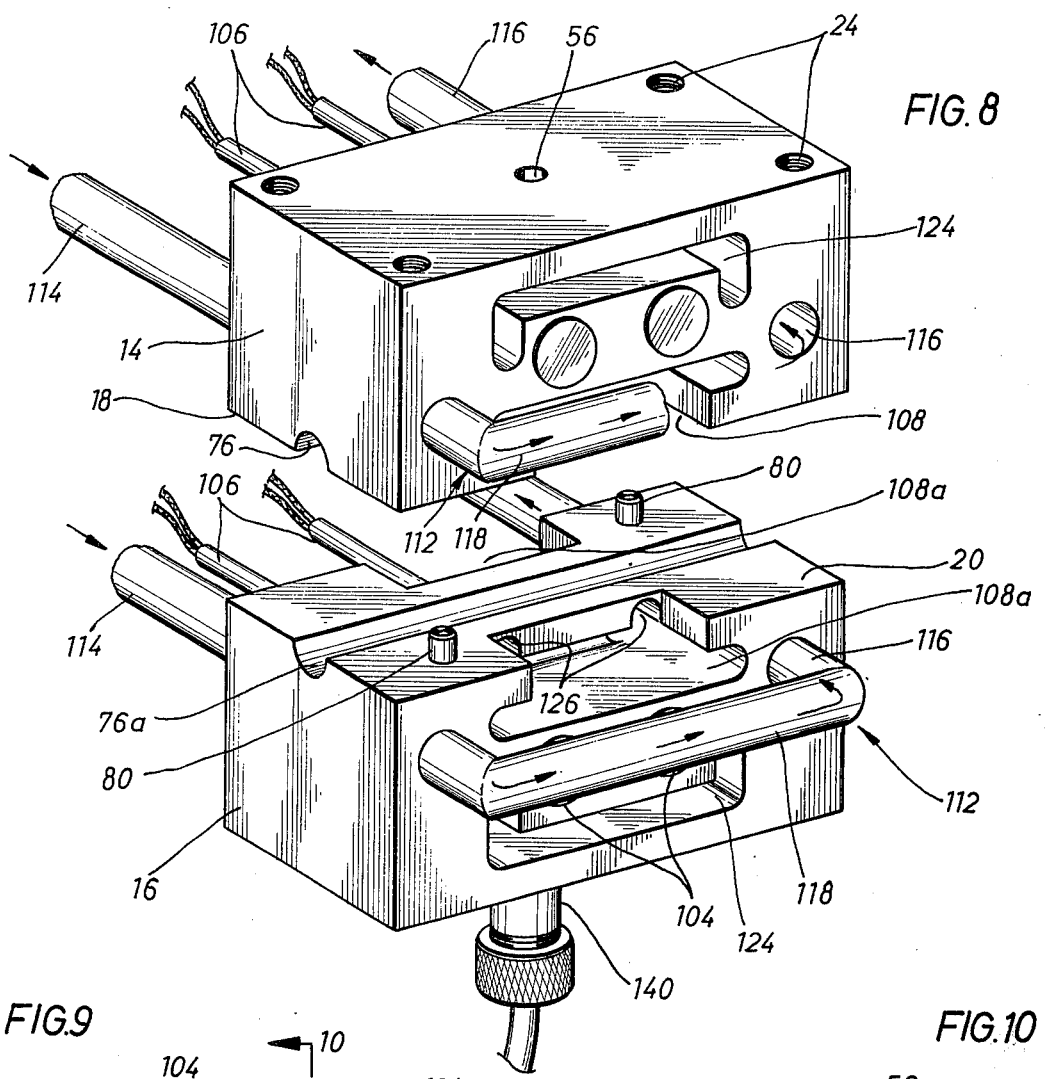
FIG. 8
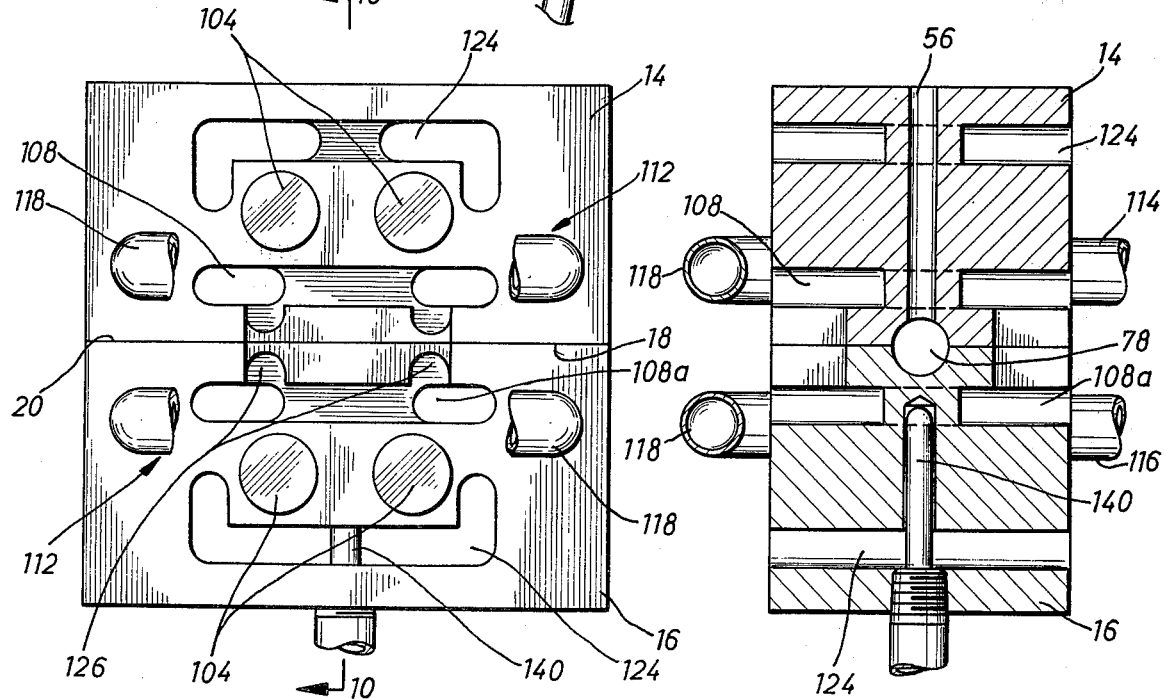
FIG. 9
FIG. 10

APPARATUS FOR REPAIRING CONDUCTOR INSULATION

BACKGROUND OF THE INVENTION

1. Field of the Invention

The present invention relates to apparatus for repairing insulation of an insulated conductor. More particularly, the present invention relates to such apparatus which is effective for repairing holes and bubbles in the insulation of an insulated conductor.

2. Description of the Prior Art

Insulated conductors, such as single conductors, coaxial cable, etc., are conventionally formed by extruding insulation about the conductive wire or wires. Typically, the insulation comprises a thermoplastic material. The insulated conductors are generally formed in lengths of 18,000 to 19,000 feet, lengths up to 37,000 feet being common. These lengths are typical in the manufacture of insulated conductors for use in sub-surface cables, etc.

The extrusion of insulator onto a conductor in the fabrication of an insulated conductor of such great length inevitably results in certain imperfections or defects in the extrusion. These show up, for example, as pinholes and bubbles, often caused by out-gasing during the extrusion process. These imperfections can not be tolerated in the finished insulated conductor and as a result, must be removed. Particularly where the insulated conductor is utilized in an underwafter environment, any hole in the insulation will allow water to contact the conductor, thereby totally eliminating the effectiveness of the system.

Pinholes and other imperfections in the extruded insulation are typically discovered by subjecting the insulated conductor to a spark test or other similar test. In the past, where the insulation of the conductor of many thousands feed in length was found to have two or more major defects, such as pinholes, the entire insulation on the conductor was stripped off and new insulation extruded on the conductor. This, of course, is an expensive process, is one which results in a substantial waste of materials, and is one which requires additional consumption of time and energy. Also, when re-extruding the insulation about the conductor, there is, of course, no guarantee that the new insulation will be sufficiently free of defects or imperfections to be successfully utilized.

Early attempts to repair insulation involved the simple taping of the area in which the insulation was worn or defective. This is still currently utilized where a temporary repair can be tolerated and where there is no requiement for the dimensions of the repaired insulated conductor to be no greater than the original dimensions of the insulated conductor. However, where dimensions are important, as in most applications, such temporary taping of the insulated conductor is not an acceptable repair method. Based upon these inadequacies, several types of apparatus and several methods have been proposed for the repair of defective conductor insulation.

One such method and apparatus is illustrated, for example, in U.S. Pat. No. 2,716,523 to Tator. The method described in this patent is adapted to the insulation of short lengths of insulated electric cables where the insulation has been worn away or where splices have been made. The insulation is applied to the electric conductor at a gap in the original insulation by fitting a mold around the exposed portion of the conductor, filling the mold with a mobile liquid plastisol at room temperature, heating the mold until the plastisol solidifies into a flexible solid and removing the cable from the mold so as to expose the plastisol to room temperature. The required use of a liquid plastisol somewhat complicates the insulation repair method and the molding apparatus has no acceptable provision for confining the heating which is carried out to the area of the repair. This can lead to a serious problem where the thermoplastic insulation outside of the molding zone is heated during the repair operation and becomes sufficiently fluid to damage the previusly undamaged portions of the insulated conductor. While this method is suggested as an improvement over a typical method of melting a thermoplastic material about the repair area of the insulated conductor, the method and apparatus of Tator has not been found to be commercially attractive.

A further method and apparatus for repairing damaged insulation is illustrated in U.S. Pat. No. 3,268,006 to Gill. The method and apparatus of this patent are specifically adapted to the repair of marine cables and the like. The exposed portion of the conductor to which a thermoplastic is to be applied is enclosed in a demountable mold having an extrusion chamber of a length shorter than the length of material to be introduced to repair the thermoplastic insulation. The mold chamber has in coaxial alignment an entrance die of variable diameter within a range including the inner and outer diameters, respectively of the thermoplastic layer to be applied and an exit die of a diameter which remains constant and is substantially equal to the external diameter of the thermoplastic layer. The conductor is located so that at the start of the repair operation, one end of the existing plastic layer is introduced into the exit die. Thermoplastic material is injected in the moltant condition into the mold chamber so that it unites with the thermoplastic layer at this one end and relative movement of the mold with respect to the conductor member longitudinally is carried out so that the successive portions of the conductor enter the entrance die and leave with the thermoplastic layer in position at the exit die. Generally, the mold unit is maintained stationary and to effect the repair, the cable is drawn through the mold chamber.

The method and apparatus of the Gill patent suffer from certain inherent disadvantages. The need to draw the conductor through the mold in order to repair insulation is a clear disadvantage, providing many more possibilities for inadequate repair. Moreover, like the molding apparatus illustrated in the Tator patent, no satisfactory provision is made in the mold of Gill to prevent the heating associated with the heated thermoplastic to go beyond the confines of the mold. Again, this type of system has not been found commercially attractive.

In areas different from insulation repair, but having some common features, various types of molds have been developed. For example, U.S. Pat. No. 3,496,609 to Ferguson illustrates an injection mold for vulcanizing the insulation of an electrical cable to a tapered metal flange mount. This mold includes a removable central section in the injection mold with the central section comprising a split, centrally grooved cable enclosing means for holding the cable and split centrally grooved spur enclosing means. Sets of graduated cable enclosing means and graduated spur enclosing means allow the mold to be utilized for a variety of different sizes of cables. This type of mold arrangement, however, like those previously discussed in connection with the Tator and Gill patents, does not provide for a cooling of the insulation material and, as such, can not be successfully adapted to the repair of the insulation of an insulated conductor.

U.S. Pat. No. 3,754,845 to Rauscher, discloses an apparatus for splicing jacketed cable in which a horizontally split mold is arranged to receive a cable which is to be insulated by extruding insulating material into the mold. The arrangement of the Rauscher patent includes tensioning blocks at opposite ends of the mold to maintain the cable centered during the molding operation. Heating element wires are arranged within the mold so that the jacket portions of insulation on the cable are not melted, but the center section of the mold is heated to a temperature above the melting point of the materials supplied by an extruder. Cooling water passages are provided for cooling the entire mold after the insulation operation.

Like the previously discussed apparatus, the apparatus used in splicing jacketed cable described in the Rauscher patent cannot be effectively utilized in the repair of insulation of an insulated conductor. Again, no adequate provision is made in this apparatus for preventing damage to the insulation during heating, particularly in an area adjacent the splicing zone.

U.S. Pat. No. 3,783,057 to McNerney, one of the present co-inventors, describes a wire insulation splicing technique for high temperature well logging cables. This patent illustrates a mold having enlarged heat sinks at the extremities of the mold. While this system is certainly quite effective in the splicing technique described, the presence of the enlarged heat sinks provides for a more cumbersome apparatus, not particularly adaptable to the repair of insulation of an insulated conductor. This mold, therefore, has not been applied to the repair of insulation. Accordingly, the art has still sought a machine or apparatus that can effectively repair the insulation of an insulated conductor in an efficient and effective manner, producing a repaired conductor having dimensions which do not exceed the original dimensions of the insulated conductor. This has now been achieved in accordance with the present invention.

SUMMARY OF THE INVENTION

The disadvantages associated with previously proposed molding apparatus for the repair of insulation have been eliminated in accordance with the present invention through the provision of a molding apparatus which effectively and efficiently allows the repair of insulation of an insulated conductor in a manner by which the dimensions of the repaired insulated conductor, after surface finishing, do not exceed the original dimensions of the insulated conductor. More importantly, the molding apparatus of the present invention allows for the repair of conductor insulation without causing the sacrifice of critical electrical and physical properties of the conductor insulation.

The molding apparatus in accordance with the present invention includes a split yoke, e.g., a horizontally split yoke comprising upper and lower plates, at least one of the plates being vertically movable relative to the other, the upper and lower plates having mating surfaces defining a molding zone;

an elongate substantially cylindrical cavity formed in the mating surfaces of the upper and lower plates;

an elongate split substantially cylindrical conductor mold being adapted to hold the insulated conductor during repair and having an inside diameter substantially equal to the original dimensions of the insulated conductor; an opening in the conductor mold, e.g., a gate opening formed in an area of lesser diameter, for the introduction of insulator, generally thermoplastic insulator, into the conductor mold, such opening communicating with the area of the insulated conductor under repair;

an injection bore through one of the plates, i.e., through the upper plate, one end of such injection bore terminating adjacent the opening in the conductor mold;

injection molding means communicating with the injection bore to allow injection of insulator into the conductor mold through the injection bore and mold opening, such injection molding means generally comprising a pneumatically operated piston positioned to inject thermoplastic insulator through the injection bore into the conductor mold through the opening in the conductor mold;

means for moving at least one of the plates relative to the other of the plates, e.g., vertically moving the lower plate into engagement with a stationary upper plate, so as to bring the plates into a closed position and to allow the plates to assume an open position for the insertion and removal of the conductor mold from the cylindrical cavity;

heater means within the yoke to melt the thermoplastic insulator over only an area comprising the central area of the conductor mold, such heater means being localized in such central area; and cooling means within the mold to cool the ends of the conductor mold while the central area is heated so that the heat applied to the insulated conductor within the conductor mold will not extend to insulated conductor outside the molding zone.

In accordance with a preferred embodiment of the present invention, the cooling means comprises means for circulating coolant, e.g., cooling water, within the molding zone above and below the conductor mold in an area outside the heated central area. This is achieved by the use of coolant conduits, both above and below the conductor mold, i.e., a coolant conduit in both the upper mold plate and lower plate. Each of the coolant conduits includes a first leg on one side of the central area of the conductor mold, a second leg on the opposite side of such central area, and a third leg connecting the first and second legs outside the molding zone; the first and second legs being substantially perpendicular to the axis of the conductor mold. Coolant, e.g., cooling water, is circulated through the coolant conduits from a supply of coolant by means of a suitable pump. Continuous circulation is carried out during the time in which the central area of the conductor mold is heated to melt the thermoplastic insulator. The use of the coolant conduits sets up a barrier to the transfer of heat outside of the molding zone, thereby preventing softening and damaging to undamaged insulation outside the molding zone.

In accordance with a further preferred embodiment of the present invention, the apparatus includes fan positioned to blow air on the molding zone after completion of the insulation operation. This use of a fan assists in the rapid cooling and hardening of the thermoplastic insulation after the required repair has been made. Furthe heat transfer efficiencies are effected by forming slots in each of the mating surfaces of the plates in the area surrounding the heated central molding zone. By this means, the central heated section of the yoke is isolated, thus minimizing transfer of heat to other parts of the yoke during the molding process while at the same time facilitating rapid cooling when the heating cycle is completed.

In accordance with the present invention, the conductor insert or mold is provided with a longitudinal slot or groove which receives the insulated conductor during the repair operation. To allow the molding apparatus of the present invention to be utilized in connection with insulated conductors of varying diameters, a series of the conductor inserts or molds is provided, each having a groove of a different diameter so as to be capable of receiving a different sized insulated conductor.

The apparatus of the present invention eliminates the disadvantages associated with previously proposed apparatus for repairing the insulation of an insulated conductor. Of principal importance in accordance with the present invention is that the entire yoke is not heated and, a portion of the yoke outside of the central area is subjected to cooling during the heating operation. If the entire yoke were to be heated, an extreme temperature differential would exist in conductor plastic at the ends of the yoke. This would present a problem of increased flowability of the plastic insulator outside of the molding zone and outside of the area being repaired. Moreover, heating of the entire yoke would make it difficult to maintain the conductor centered with the entire area in the mold being molten. Centering must be controlled in order to provide an acceptable insulation repair. Under certain circumstances, in an alternate embodiment of the present invention, a tensioning unit is utilized to assist in maintaining the conductor centered during the repair operation by maintaining the conductor under tension within the conductor mold. A pulley system is utilized for this tensioning.

Accordingly, it is a principal feature of the present invention to provide apparatus for the repair of insulation of an insulated conductor, which apparatus eliminates the deficiencies and drawbacks of previously proposed apparatus and accomplishes this without any sacrifice of the electrical and physical properties of the conductor insulation.

It is a further feature of the present invention to provide such apparatus for the repair of insulation of an insulated conductor wherein the apparatus includes a split yoke having an elongate substantially cylindrical cavity formed in the mating surfaces of the yoke, an elongate split substantially cylindrical conductor mold removable positioned in the cavity and adapted to hold an insulated conductor during repair, injection molding means for the injection of thermoplastic insulator into the conductor mold in the area of the desired repair, heating means within the yoke to melt the insulator over only an area comprising the central area of the conductor mold and cooling means within the yoke to cool the ends of the conductor mold while the central area is heated, whereby the heat applied to the insulated conductor within the conductor mold does not extend to insulated conductor outside the molding zone.

A still further feature of the present invention resides in such apparatus for the repair of insulation of an insulated conductor wherein upper and lower yoke plates are each provided with conduits for circulating coolant so as to cool the ends of the conductor mold beyond a heated central area, each of such conduits including a first leg on one side of the heated central area of the conductor mold, a second leg on the opposite side of such heated central area and a third leg connecting the first and second legs outside the molding zone; the first and second legs of each conduit being substantially perpendicular mold.

Yet further feature of the present invention resides in such apparatus wherein the apparatus includes yoke plates specially constructed to provide maximum isolation of the central heated zone from the rest of the yoke body, and a fan positioned to blow air on the molding zone after completion of the insulation repair.

Yet a further feature of the present invention resides in such apparatus for the repair of insulation of an insulated conductor wherein the centering of the insulated conductor within the conductor mold is assisted by a tensioning unit to maintain the insulated conductor under tension.

A further feature of the present invention resides in the utilization of a series of conductor molds, each with a longitudinal slot or groove of a diameter specific for utilization with a particular insulated conductor, the series of conductor molds allowing the apparatus to be utilized for conductor insulation repair substantially regardless of the diameter of the insulated conductor.

Still further features of the present invention and further advantages of the present invention will become more apparent from the following detailed description of preferred embodiments, particularly in connection with the accompanying drawings which are set forth to illustrate various preferred elements of the present invention.

IN THE DRAWINGS

FIG. 2 is a top view of the molding zone of the apparatus of FIG. 1 cut above the yoke along line 2—2 and illustrating the use of an air blower or fan;

FIG. 3 is an exploded view of the split conductor mold used in the apparatus of the present invention;

FIG. 4 is a view of the split conductor mold of FIG. 3 as utilized in the yoke of the apparatus of the present invention;

FIG. 5 is a diagramatic illustration of an insulated conductor having a defect requiring repair;

FIG. 6 is a diagramatic illustration of the insulated conductor of FIG. 5 immediately after repair and before finishing;

FIG. 7 is a diagramatic illustration of the insulated conductor of FIGS. 5 and 6 after surface finishing;

FIG. 8 is an exploded view of the upper and lower plates of the yoke in accordance with the present invention, specifically illustrating coolant conduits, heaters, and air passages;

FIG. 9 is a front view of the molding zone of the apparatus of the present invention showing the upper and lower plates together, without the conductor mold, partially cut away to illustrate air passages through the plates; and FIG. 10 is a cross-sectional view taken along line 10—10 of FIG. 9 showing the injection bore and thermocouple relationship.

DESCRIPTION OF PREFERRED EMBODIMENTS

Figure 1:
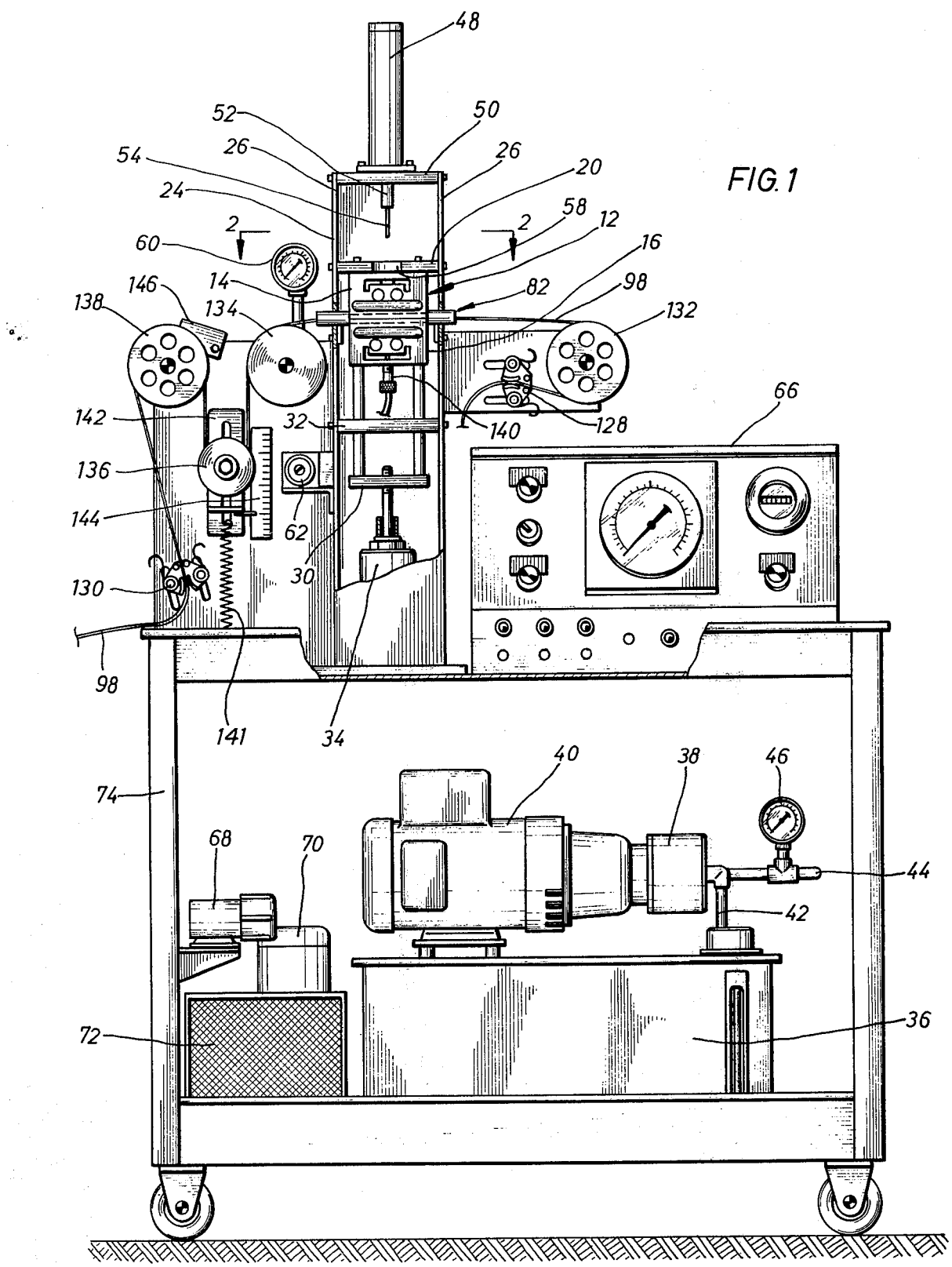
FIG. 1 is an elevation view showing the repair apparatus of the present invention.

An elevation view of the repair apparatus of the present invention is illustrated in FIG. 1. As illustrated, the invention comprises a split yoke 12 which is formed of an upper or first plate or block 14 and a lower or second plate or block 16. As seen more clearly in later figures, upper plate 14 and lower plate 16 have, respectively, mating surfaces 18 and 20 which form therebetween a molding zone.

In the embodiment set forth, upper plate 14 is stationary, mounted to mounting plate 20 by means of mounting screws or rivets 22. Mounting plate 20 is fixedly secured to upright support members 24.

The opening and closing of yoke 12 is achieved by the vertical movement of lower plate 16, which is connected by rods (not shown) through spacers 28 to hydraulic cylinder mounting plate 30. Spacers 28 pass through guide plate 32 to maintain proper orientation of lower plate 16. The opening and closing of the yoke through the vertical movement of lower plate 16 is achieved by the reciprocating action of hydraulic cylinder 34. Hydraulic fluid for actuation of hydraulic cylinder 34 is drawn from hydraulic reservoir 36 by means of hydraulic pump 38 operated by electric motor 40. The hydraulic fluid is drawn from hydraulic reservoir 36 through pick-up line 42 and passed through lead line 44 to hydraulic cylinder 34. A suitable pressure gauge 46 can be utilized to record the pressure in cylinder 34. The hydraulic lines both to and from hydraulic cylinder 34 are not illustrated for the sake of convenience and clarity and, FIG. 1 merely illustrates a typical arrangement for the actuation of hydraulic cylinder 34. In practice, any conventional arrangement for the operation of hydraulic cylinder 34 can be utilized and hydraulic cylinder 34 can be replaced by an air cylinder or any other pneumatic or mechanical means to allow vertical movement of lower plate 16 so as to effectively allow the opening and closing of yoke 12.

The injection of thermoplastic insulator into yoke 12 is achieved by the use of injection cylinder 48 mounted to mounting plate 50. Injection cylinder 48 provides for reciprocation of piston rod 52 which has attached thereto injection needle 54. Injection needle 54 pushes thermoplastic insulator into yoke 12 through injection bore 56 (seen in FIG. 2). Injection bore 56 passes vertically through upper plate 14 and communicates with the molding zone formed by mating surfaces 18 and 20. A cut out area 58 formed in mounting plate 22 allows the upper surface of upper plate 14 surrounding injection bore 56 to be utilized as a ledge or plateform to hold the thermoplastic insulator prior to injection by means of injection needle 54.

Injection cylinder 48 in accordance with the present invention can be an air cylinder or hydraulic cylinder or any mechanical device which allows injection needle 54 to be lowered into injection bore 56 for the injection of the thermoplastic insulator into the molding zone. Again, for the sake of clarity, the connections between injection cylinder 48 and the source of hydraulic or air pressure are not illustrated. FIG. 1 does illustrate, however, a typical installation utilizing a pressure gauge 60 and a manual pressure adjustment knob 62 to allow adjustment of the pressure in injection cylinder 48. A pressure regulator 64 is illustrated in FIG. 2.

The thermoplastic insulator which is injected into yoke 12 by means of injection needle 54 is generally utilized in the form of pellets of a size which fit within injection bore 56. A close tolerance is provided between injection needle 54 and injection bore 56 so that the pellets of thermoplastic insulator will be injected under pressure into the molding zone of yoke 12. Any typically utilized thermoplastic insulator can be injected in this manner with non-limiting examples, including polyethylene, polypropylene, ethylene-propylene copolymers, polyvinyl chloride, polyurethane, and fluoropolymers, for example, fluorinated ethylene-propylene copolymer. Of course, the apparatus of the present invention is in no way limited by the type of thermoplastic insulator utilized and modification of the injection pressure and modification of the temperature to which the thermoplastic insulator is heated can be easily determined for any particular thermoplastic insulator.

As will be described hereinafter in connection with the remaining figures, yoke 12 in accordance with the present invention includes a substantially cylindrical cavity formed in the mating surfaces of upper and lower plates 14 and 16 respectively and a conductor insert or mold removably positioned in such cavity. Heaters are provided to heat the central area of the conductor insert, i.e., that area containing the damaged insulation, to a temperature above the melting point of the injected thermoplastic insulator. At the same time, the ends of the conductor mold beyond the central area but within the yoke are cooled so as to effectively prevent heating of the entire yoke and the previously described disadvantages associated therewith. Suitable temperature control and time control of the repair operation is carried out by a control center 66. Again, for purposes of clarity, connection between control center 66 and heaters is not illustrated and any conventional temperature control can be utilized to achieve the advantages of the present invention. Control center 66 is also utilized to actuate hydraulic cylinder 34 and injection cylinder 48.

Also, FIG. 1 illustrates the use of a coolant pump 68 to withdraw coolant from container 70 which is passed through the coolant conduits of yoke 12 and passed through radiator 72. Again, for the sake of clarity, the connections are not illustrated in FIG. 1 and the arrangement by which the coolant is passed through the yoke 12 is subject to a great many modifications. The coolant utilized in carrying out the repair method utilizing the apparatus of the present invention can be cooling water or any conventionally used coolant.

As illustrated in FIG. 1, all of the necessary apparatus for carrying out the repair of the insulation of the insulated conductor is on a movable cart 74. This allows the apparatus to be mobile and allows the apparatus to be moved to various locations where repair of damaged insulation of the insulated conductor is necessary. As will be evident from the following discussion of the various elements of yoke 12 itself, the apparatus of the present invention has the additional feature that no cutting of the insulated conductor is required to carry out the repair method.

The various elements of yoke 12 are more clearly seen in FIGS. 2–4 and 8–10. As illustrated in these figures, the mating surface 18 of upper plate 14 includes a longitudinal slot 76, a corresponding, mating longitudinal slot 76a being formed in mating surface 20 of lower plate 16. When plate 14 and plate 16 are in a closed molding position, slots 76 and 76a together form an elongate substantially cylindrical cavity 78 extending the entire length of the molding zone formed by upper molding plate 14 and lower molding plate 16. Alignment of plates 14 and 16 is achieved by alignment pins 80 protruding from the mating surface 20 of lower plate 16 and corresponding holds (not shown) in mating surface 18 of upper plate 14.

As illustrated in FIGS. 2–4 and 8–10, an elongate, split substantially cylindrical conductor insert or mold 82 is provided to be removably positioned in cavity 78. The construction of this mold 82 is more clearly seen in FIGS. 3 and 4. The diameter of the main body portion of mold 82 is substantially equal to the diameter of cavity 78. However, an area of reduced diameter 84 is centrally located in mold 82, this area of reduced diameter 84 being aligned with injection bore 56 when mold 82 is positioned within cavity 78 and yoke 12 is in a closed position. When mold 82 is in a closed position as illustrated in FIG. 4, a gate opening 86 is formed in the area of reduced diameter 84. This gate opening allows the molten thermoplastic insulator to enter the interior of mold 82. In the specific preferred embodiment illustrated in FIGS. 3 and 4, mold 82 is horizontally split into an upper section 88 and lower section 90. Alignment of upper section 88 and lower section 90 is achieved by means of alignment pins 92 and corresponding holes 94.

As illustrated in FIG. 3, upper section 88 of mold 82 is formed with a longitudinal slot or groove 96, with a corresponding longitudinal slot or groove 96a being formed in the lower section 90 of mold 82. When the mold is closed as in FIG. 4, slots 96 and 96a together form a longitudinal channel the entire length of mold 82. As illustrated in FIG. 4, an insulated conductor 98 rests in such longitudinal channel. The outer dimensions of the insulated conductor 98 are substantially equal to the diameter of the longitudinal channel. This is achieved by selecting a desired conductor mold 82 from a set of conductor molds based on the diameter of the insulated conductor.

Insulated conductor 98 is placed in conductor mold 82 so that the area requiring repair is in that area corresponding to the area of reduced diameter 84 and gate opening 86. In this way, molten thermoplastic insulator which flows around the area of reduced diameter 84 and through gate opening 86 can effectively come in contact with and fill any damaged insulation of the insulated conductor.

In the embodiment illustrated in FIGS. 3 and 4, conductor mold 82 has enlarged ends which are adapted to be received in corresponding openings in upright support members 26. Upright support members 26 are equipped with spring clips or other locking mechanism (not shown) to retain conductor mold 82 in a locked position and orientation of conductor mold 82 is maintained by means of grooves 102. When yoke 12 is in a closed molding position, conductor mold 82 is securely locked in the yoke in cavity 78. Accordingly, the locking mechanism which is associated with enlarged ends 100 of conductor mold 82 is utilized only prior to closing of yoke 12, the locking mechanism giving the operator freedom to operate the control panel without consideration of the orientation of conductor mold 82 within the yoke. The same results could be achieved by the operator without any locking device with a satisfactory provision being made for initiating the upward vertical movement of lower plate 16 so as to place yoke 12 in a closed position.

The conductor mold 82 is utilized in the apparatus of the present invention so that the apparatus can be adapted to the repair of insulation of insulated conductors of varying diameter. By utilizing the conductor mold 82, insulated conductors of varying diameters can be repaired simply by providing a plurality of such molds 82, each with a groove or slot corresponding to an insulated conductor of a certain diameter. This allows a single repair unit to be applicable for the repair of insulated conductors over extremely wide limits. For the sake of convenience, only a single conductor mold is illustrated in FIGS. 3 and 4.

As illustrated in FIGS. 2 and 8–10, both upper plate 14 and lower plate 16 are provided with heating elements 104. These heating elements 104 are connected by suitable electrical leads 106 to a source of electricity (not shown). Preferably, heating elements 104 comprise Chromalox heaters, compression fit into openings extending the entire depth of upper plate 14 and lower plate 16. As illustrated, injection bore 56 extends vertically through upper plate 14 between heating elements 104. In this way, the thermoplastic insulator injected through injection opening 56 is quickly heated by heating elements 104 to a molten condition so as to flow about area 84 of reduced diameter of conductor mold 82 and through gate opening 86, coming into contact with the damaged insulation of conductor insulator 98.

Heaters 104 are centrally located so that the heat from heaters 104 is applied only to a central area of conductor mold 82. This is essential to avoid the disadvantage of the heat from heaters 104 spreading beyond the confines of yoke 12 and melting or otherwise damaging the insulation of conductor 98 outside the molding zone. Heat transfer from heating elements 104 to the conductor mold 82 within cavity 78 is maximized by assuring that the web of metal in the yoke which separates the heating elements from the conductor mold is kept as thin as practical. Further dissipation of the heat to other parts of the yoke is minimized by isolating the central heated area surrounding the heating elements and the conductor mold. This is achieved by milling slots 108, 108a, 124 and 126 into the mating surfaces 18 and 20 of upper plate 14 and lower plate 16 respectively. A thermocouple 140 is positioned very near cavity 108 between heating elements 104 so as to sense the heat from conductor mold 82 within cavity 78. This heat is monitored and controlled by unit 66 in a manner well known in the art.

If no provision were made in yoke 12 to cool portions of the mold outside of the central area heated by heating elements 104, heat would be transferred through the metal of yoke 12 to the extremities of yoke 12 and areas of insulation of insulated conductor 98 outside the molding zone would tend to become flowable and as a result damage the previously undamaged insulation. Also, centering of the insulated conductor would be difficult. In order to prevent this problem, both upper plate 14 and lower plate 16 include coolant conduits 112 which cool the ends of conductor mold 82 outside of the central area heated by heating elements 104. In the preferred embodiment illustrated in FIGS. 2 and 8–10, coolant conduits 112 include first and second legs 114 and 116, substantially perpendicular to the axis of cavity 78 and conductor mold 82 and a third leg 118 connecting the first and second legs outside of the molding zone of yoke 12. Accordingly, the coolant passing through coolant conduit 112 does not cool the central area of conductor mold 82 but only the ends of conductor mandrel 82 outside of such central area and outside of the area where repair is being carried out. The presence of these coolant conduits 112 thereby pevents the heat from heaters 104 from being transferred beyond the central area of yoke 12.

In the embodiment illustrated, coolant is pumped from container 70 by coolant pump 68 through the first leg 114 and out the second leg 116 of coolant conduit 112. For the sake of clarity, the necessary coolant lines are not illustrated although, as seen in FIG. 1, a radiator 72 is present so that the coolant can be passed through radiator 72 to give off the heat which is picked up by the coolant in cooling the ends of mold 82 beyond the central area heated by heating elements 104. Conventional coolant lines can be utilized and, as previously indicated, the coolant can be cool water or other similar coolant. Moreover, the apparatus of the present invention can utilize separate coolant lines to feed each of the coolant conduits 112 or, a single coolant line can emanate from pump 68 which is split to feed coolant line 112 in the upper plate 14 and coolant line 112 in lower plate 16. Again, the presence of a means for cooling, i.e., coolant conduits, in yoke 12 to prevent the transfer of heat out of the central area of yoke 12 is essential to achieve the advantages of the apparatus of the present invention with respect to the efficient and effective insulation repair of insulated conductors.

After the injected thermoplastic insulation is heated within conductor mold 82 in and around the damaged area of the insulation, it is necessary to cool the molten thermoplastic insulation to effect hardening. Some cooling is, of course, carried out simply by turning off the heating elements 104 so that no further heating takes place. In addition, however, more rapid cooling is achieved by use of a fan or blower 120 which blows air over the central area of conductor mold 82 after the desired length of heating. Fan 120 is mounted to the upright support members 26 by a suitable mounting bracket 122. The unrestricted flow of air across the central area of yoke 12 is facilitated to a large degree because of the isolation of the central area by milled slots 124 and 126. Thus, isolation of the central heated area not only prevents unwanted heat transfer during the heating cycle but also facilitates greater dissipation of heat in the central area of yoke 12 after the heating operation.

For most insulation repairs, sufficient centering of the insulated conductor is achieved without the use of any tensioning unit placing the insulated conductor under tension during the repair. However, as the wall thickness of the insulated conductor decreases, there is an increasing tendency towards the need for some tension upon the insulated conductor in order to maintain proper centering. This tensioning is achieved by means of the tensioning unit illustrated in FIG. 1.

As seen in FIG. 1, insulated conductor 98 is clamped on opposite sides of the repair apparatus by means of clamps 128 and 130. From clamp 128, insulated conductor 98 passes around reel 132, through the conductor mandrel 82 within mold 12 and on the other side of mold 12 passes over idler pully 134 around pully 136, around reel 138 and finally is clamped by clamp 130. Of course, multiple turns of insulated conductor 98 can be made around reels 132 and 138. Pully 136 is connected to spring 141 and is slidably positioned in pully mount 142. A scale 144 is provided to record the tension placed upon insulated conductor 98. Tension is applied to insulated conductor 98 by turning reel 138 and locking reel 138 in a desired position providing the desired tension by means of ratchet 146. A gear (not shown) associated with ratchet 146 is located behind reel 138. This gear and rachet mechanism allows a very fine adjustment of the tension applied to insulated conductor 98. In this way, the conductor can be maintained under tension and any deviation from proper centering of the insulated conductor 98 during the repair operation totally avoided.

In utilizing the apparatus of the present invention, a defect such as a pinhole or bubble will be detected in a spark or water test conventionally carried out after the extrusion of conductor insulation. A typical insulated conductor 98 with a pinhole 148 is represented in FIG. 5. Prior to proceeding with use of the apparatus, the area around the defect, i.e., burned or blistered plastic surrounding the pinhole, will be trimmed away and the area to be repaired will be cleaned. Typical thermoplastics useful in the apparatus of the prsent invention can be cleaned with trichloroethylene. Where a repair is to be made in an elastomer, such as EPDM, after trimming away the defective area, the area can be roughened with sandpaper and cleaned with a suitable solvent such as acetone or methyl ethyl ketone.

The insulated conductor is then placed in a conductor mold, being sure that the area to be repaired is centered within the insert. This is done either with or without use of a tensioning device to apply tension to the insulated conductor during the repair operation. The apparatus of the present invention is then utilized by injection of insulation into the conductor mold and through the gate opening in the manner previously described. This is done after allowing the yoke to reach the desired temperature for the particular thermoplastic material utilized. After the required heating time (additional time for curing when utilizing EPDM), the mold is allowed to cool and additional cooling is carried out by blowing air from a fan. The plastic must solidify and the EPDM must cure under pressure. After this solidification, the yoke can be opened and the insulated conductor broken loose from the conductor mold. It will have a general configuration as illustrated in FIG. 6 with a flashing 150 surrounding the area which has been repaired. This flashing 150 can be removed in a conventional manner and after removal the insulated conductor will appear as in FIG. 7, with the original pinhole or other defect being virtually invisible. Moreover, the dimensions of the repaired insulated conductor will not exceed the original dimensions of the insulated conductor.

In the following table, typical insert bore diameters, inject pressure ranges, maximum tension and mold temperatures for various insulators are shown. The information set forth in the following table comprises typical parameters which can be utilized in performing insulation repair utilizing the apparatus of the present invention.

| Injection Material | Insert Bore | Inject Pressure Range (psi) | Tension Max. Limit (psi) | Mold Temperature °F |
|---|---|---|---|---|
| EPC | .100 | 10–20 | 15 | 450°F |
| EPDM | .100 | 25 | 15 | 200°F preheat 450°F cure for 5 minutes |
| FEP | .068 | 25 | 15 | 780°F |
| FEP | .119 | 25 | 25 | 780°F |
| EPC | .095 | 15 | 15 | 450°F |
| EPC | .068 | 10–15 Inject at 10 | 15 | 450°F |
| FEP | .056 | Increase to 25 | 15 | 780°F |

EPC — ethylene-propylene copolymer
EPDM — ethylene propylene terpolymer
FEP — fluorinated ethylene-propylene copolymer (TEFLON FEP)

While the present invention has been described primarily with regard to the foregoing exemplification, it should be apparent that the present invention can be subject to various modifications within the scope of the present invention. Accordingly, the present invention can not be limited to the embodiments above, but must be construed as broadly as any and all equivalents thereof.

What is claimed is:

1. Apparatus for repairing insulation of an insulated conductor, which comprises:
   a. a split yoke comprising first and second plates, at least one of said plates being movable relative to the other of said plates, said first and second plates having mating surfaces defining a molding zone;
   b. an elongate, substantially cylindrical cavity formed in the mating surfaces of said first and second plates;
   c. an elongate, split, substantially cylindrical conductor mold removably positioned in said cavity, said conductor mold being adapted to hold the insulated conductor during repair and having an inside diameter substantially equal to the original dimensions of the insulated conductor, said conductor mold including a central area corresponding to the area of the insulated conductor being repaired and end areas outside the central area;
   d. an opening in said conductor mold for the introduction of insulator, said opening communicating with the area of the insulated conductor being repaired;
   e. an injection bore through one of said plates, one end of said injection bore terminating adjacent said opening in said conductor mold;
   f. injection molding means communicating with said injection bore to inject insulator into said conductor mold through said injection bore and opening;
   g. means for moving at least one of said plates relative to the other of said plates to bring said plates into a closed molding position and an open position for removal of said conductor mold from said cavity;
   h. heater means within said yoke to melt said insulator over only an area comprising the central area of said conductor mold; and
   i. cooling means within said yoke to cool only the end areas of said conductor mold while said central area is heated, whereby the heat applied to insulated conductor within said conductor mold does not extend to insulated conductor outside the molding zone.

2. The apparatus of claim 1, further including: means for maintaining the insulated conductor under tension within said conductor mold.

3. The apparatus of claim 1, wherein said injection molding means comprises a pneumatically operated piston positioned to inject insulator through said injection bore into said conductor mold through said opening in said conductor mold.

4. The apparatus of claim 1, further including: means for sensing the temperature of the central area of said conductor mold and maintaining the temperature sufficient to melt the injected insulator.

5. The apparatus of claim 4, wherein the sensing means comprises a thermocouple located adjacent the central area of said conductor mold.

6. The apparatus of claim 1, wherein said cooling means comprises means for circulating coolant within the molding zone above and below said conductor mold in the area of the ends of said conductor mold.

7. The apparatus of claim 6, wherein said means for circulating coolant comprises a pump connected to a supply of coolant and coolant conduits above and below said conductor mold in the area of the ends of said conductor mold, said pump continuously circulating coolant through coolant conduits during insulation repair.

8. The apparatus of claim 7, wherein each of said coolant conduits includes a first leg on one side of the central area of said conductor mold, a second leg on the opposite side of the central area and a third leg connecting said first and second legs outside the molding zone, said first and second legs being substantially perpendicular to said conductor mold.

9. The apparatus of claim 1, wherein said conductor mold includes a longitudinal channel to hold the insulated conductor.

10. Apparatus for use in the repair of insulation of an insulated conductor comprising:
    a yoke comprising:
    upper and lower plates having mating surfaces forming a molding zone;
    an elongate, substantially cylindrical cavity formed in the mating surfaces of said plates;
    an elongate, split, substantially cylindrical conductor mold removably positioned in said cavity, said conductor mold being adapted to hold an insulated conductor during repair, said conductor mold including a central area corresponding to the area of the insulated conductor being repaired and end areas outside the central area;
    a gate opening in said conductor mold for the introduction of insulator, said gate opening communicating with the area of the insulated conductor under repair;

an injection bore vertically through said upper plate, the lower end of said injection bore terminating adjacent said gate opening;

heater means within each of said upper and lower plates to heat the central area of said conductor mold; and cooling means within each of said upper and lower plates to cool only the end areas of said conductor mold while the central area is heated, whereby the heat applied to the insulated conductor within said conductor mold does not extend to insulated conductor outside the molding zone.

11. The apparatus of claim 10, wherein said yoke further includes means for sensing the temperature of the central area of said conductor mold.

12. The apparatus of claim 11, wherein said sensing means comprises a thermocouple located adjacent the central area of said conductor mold.

13. The apparatus of claim 10, wherein said cooling means comprises coolant conduits in each of said upper and lower plates.

14. The apparatus of claim 13, wherein each of said coolant conduits includes a first leg on one side of the central area of said conductor mold, a second leg on the opposite side of the central area and a third leg connecting said first and second legs outside the molding zone, said first and second legs being substantially perpendicular to said conductor mold.

15. The apparatus of claim 10, wherein each of said upper and lower plates is slotted to isolate the central heated area of the yoke.

16. The apparatus of claim 10, wherein the mating surfaces of said upper and lower plates include a cut out slot in an area contiguous with the central area of said conductor mold.

17. The apparatus of claim 10, wherein said gate opening comprises a horizontal slot formed in the junction of the mating surfaces of said conductor mold in an area of reduced diameter.

18. The apparatus of claim 10, wherein said conductor mold includes end portions of increased diameter.

19. The apparatus of claim 10, wherein said conductor mold includes a longitudinal channel to hold an insulated conductor.

20. Apparatus for repairing insulation of an insulated conductor which comprises:
a. a split yoke comprising first and second plates, at least one of said plates being movable relative to the other of said plates, said first and second plates having mating surfaces defining a molding zone;
b. an elongate, substantially cylindrical cavity formed in the mating surfaces of said first and second plates;
c. an elongate, split, substantially cylindrical conductor mold removably positioned in said cavity, said conductor mold being adapted to hold the insulated conductor during repair and having an inside diameter substantially equal to the original dimensions of the insulated conductor, said conductor mold including a central area corresponding to the area of the insulated conductor being repaired and end areas outside the central area;
d. an opening in said conductor mold for the introduction of insulator, said opening communicating with the area of the insulated conductor being repaired;
e. an injection bore through one of said plates, one end of said injection bore terminating adjacent said opening in said conductor mold;
f. injection molding means communicating with said injection bore to inject insulator into said conductor mold through said injection bore and opening;
g. means for moving at least one of said plates relative to the other of said plates to bring said plates into a closed molding position and an open position for removal of said conductor mold from said cavity;
h. heater means within said yoke to melt said insulator over only an area comprising the central area of said conductor mold;
i. cooling means within said yoke to cool the end areas of said conductor mold while said central area is heated, whereby the heat applied to insulated conductor within said conductor mold does not extend to insulated conductor outside the molding zone; and
j. a fan positioned to blow air on the molding zone after completion of the insulation repair.

21. The apparatus of claim 20, wherein each of said first and second plates is slotted to isolate the center section of the yoke for rapid heating and cooling purposes.

22. Apparatus for repairing insulation of an insulated conductor which comprises:
a. a split yoke comprising first and second plates, at least one of said plates being movable relative to the other of said plates, said first and second plates having mating surfaces defining a molding zone;
b. an elongate, substantially cylindrical cavity formed in the mating surfaces of said first and second plates;
c. an elongate, split, substantially cylindrical conductor mold removably positioned in said cavity, said conductor mold being adapted to hold the insulated conductor during repair and having an inside diameter substantially equal to the original dimensions of the insulated conductor, said conductor mold including a central area corresponding to the area of the insulated conductor being repaired and end areas outside the central area;
d. an opening in said conductor mold for the introduction of insulator, said opening communicating with the area of the insulated conductor being repaired;
e. an injection bore through one of said plates, one end of said injection bore terminating adjacent said opening in said conductor mold;
f. injection molding means communicating with said injection bore to inject insulator into said conductor mold through said injection bore and opening;
g. means for moving at least one of said plates relative to the other of said plates to bring said plates into a closed molding position and an open position for removal of said conductor mold from said cavity;
h. heater means within said yoke to melt said insulator over only an area comprising the central area of said conductor mold;
i. cooling means within said yoke to cool the end areas of said conductor mold while said central area is heated, whereby the heat applied to insulated conductor within said conductor mold does not extend to insulated conductor outside the molding zone; and
j. a cut out slot formed in the mating surfaces of said first and second plates in the area of the central area of said conductor mold to isolate said central area for rapid cooling and heating purposes.

* * * * *

UNITED STATES PATENT OFFICE
CERTIFICATE OF CORRECTION

Patent No. 3,964,845     Dated June 22, 1976

Inventor(s) Thomas Duggan, et al

It is certified that error appears in the above-identified patent and that said Letters Patent are hereby corrected as shown below:

Column 1, line 30,    "underwafter" should read --underwater--;

line 38,    "feed" should read --feet--;

line 53,    "requiement" should read --requirement--.

Column 2, line 13,    "previusly" should read --previously--;

line 21,    "3,268,006" should read --3,368,006--.

Column 4, line 65,    after "includes" insert --a--.

Column 5, line 2,    "Furthe" should read --Further--.

Column 6, line 12,    after "perpendicular" insert --to the conductor--;

line 13,    after "Yet" insert --a--.

Column 7, line 54,    "plateform" should read --platform--.

Column 12, line 27, "prsent" should --present--.

Column 13,      on the 11th line of the chart "inject at 10" should be included on the line reading as follows: FEP    .056   --Inject at 10--   15   780° F Signed and Sealed this Twenty-second Day of February 1977

[SEAL]

Attest:

RUTH C. MASON           C. MARSHALL DANN
*Attesting Officer*          *Commissioner of Patents and Trademarks*